US007328082B2

(12) United States Patent
Endo et al.

(10) Patent No.: US 7,328,082 B2
(45) Date of Patent: Feb. 5, 2008

(54) NUMERICAL CONTROL APPARATUS

(75) Inventors: Takahiko Endo, Kokubunji (JP); Katsunori Nagano, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 142 days.

(21) Appl. No.: 11/269,572

(22) Filed: Nov. 9, 2005

(65) Prior Publication Data
US 2006/0079988 A1 Apr. 13, 2006

(30) Foreign Application Priority Data
Oct. 11, 2004 (JP) .............................. 2004-326750

(51) Int. Cl.
*G06F 19/00* (2006.01)
(52) U.S. Cl. ...................... 700/186; 700/160; 700/193; 33/630; 483/11
(58) Field of Classification Search ................ 700/160, 700/179, 186, 193; 33/628, 630, 636, 639, 33/642; 483/11
See application file for complete search history.

(56) References Cited
U.S. PATENT DOCUMENTS 4,428,055 A * 1/1984 Zurbrick et al. ............ 700/160

5,513,113 A * 4/1996 Okada et al. ................ 700/179
6,082,016 A * 7/2000 Otani et al. .................... 33/642
6,973,738 B2 * 12/2005 Kaneda et al. ................ 33/636

FOREIGN PATENT DOCUMENTS

JP 04-159058 6/1992
JP 8-25180 1/1996

OTHER PUBLICATIONS

Japanese Office Action issued Jul. 3, 2007 in corresponding Japanese Patent Application No. 2004-326750.

* cited by examiner

*Primary Examiner*—Leo Picard
*Assistant Examiner*—Sheela Rao
(74) *Attorney, Agent, or Firm*—Staas & Halsey LLP (57) ABSTRACT

A numerical control apparatus having tool cutting edge detecting unit for detecting a cutting edge position of a tool mounted on a tool rest, comprises detection signal determining unit for determining, as effective, only a detection signal that is first inputted from among a plurality of detection signals which are continuously inputted from the tool cutting edge detecting unit. A signal which is detected until a preset time is elapsed after a first signal is received when the tool comes into contact with the touch sensor, and/or until the tool moves a predetermined distance, is determined as erroneous detection by the detection signal determining unit, and the signal is disenabled.

14 Claims, 5 Drawing Sheets

NUMERICAL CONTROL APPARATUS

BACKGROUND OF THE INVENTION

1. Field of the Invention

The present invention relates to a numerical control apparatus capable of bringing a tool cutting edge of a tool mounted on a tool rest into contact with a cutting edge abutting surface of a touch sensor to detect the tool cutting edge, and setting a tool compensation amount from a cutting edge position when the tool cutting edge is detected.

2. Description of the Related Art

In a machining processing of a workpiece using a numerical control apparatus, a cutting edge position of a tool mounted on a tool rest is different in some cases from a reference position set in advance as a result of tool exchanges or the like. The numerical control apparatus executes a work program on the precondition that the cutting edge of the tool is on the reference position, but if the work program is executed while leaving the error between the cutting edge position and the reference position as it is, the machining precision is deteriorated. When the position error is great, the tool and the machine tool interfere with each other, and a problem may be caused in the machining operation itself.

Hence, in the numerical control apparatus, before the machining operation is carried out, a cutting edge position with respect to a machine original point of a tool used for the machining operation is detected by a tool cutting edge detector mounted on the machine tool, a tool compensation value is calculated from the difference between the detected cutting edge position and a cutting edge position when a reference tool is mounted, and the tool compensation value is inputted to the numerical control apparatus, thereby correcting the work program and executing the work program.

There is a known machine tool in which a tool mounted on a tool rest is brought into contact with a touch sensor to detect a cutting edge position, and a tool compensation value is calculated from a difference between the detected cutting edge position and a cutting edge position when a reference tool is mounted, and the tool compensation value is set.

Figure 5:
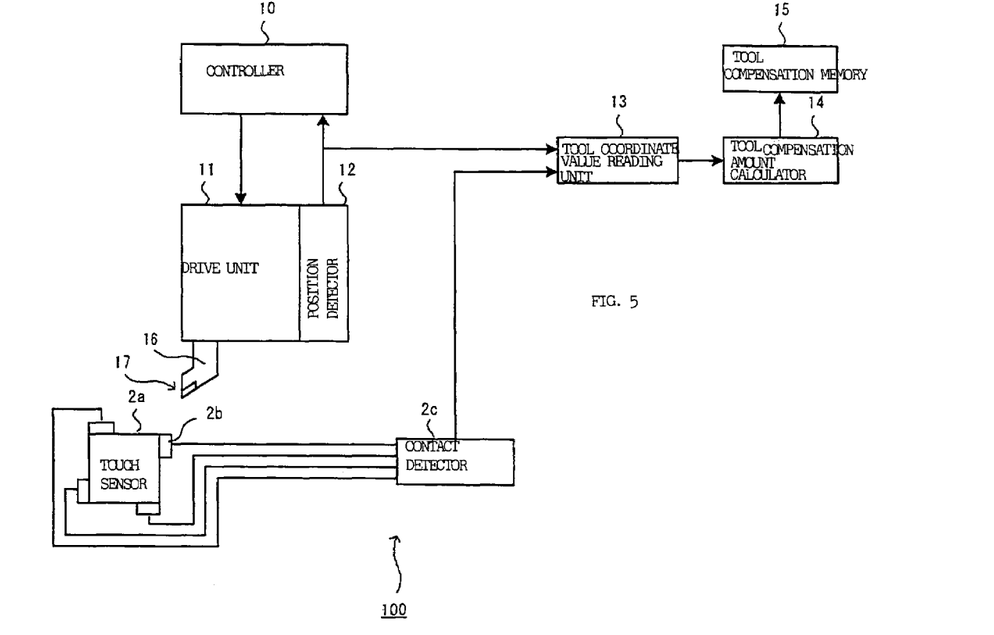
FIG. 5 is a block diagram for explaining an example of a structure for detecting a tool cutting edge in a conventional numerical control apparatus.
Figure 6:
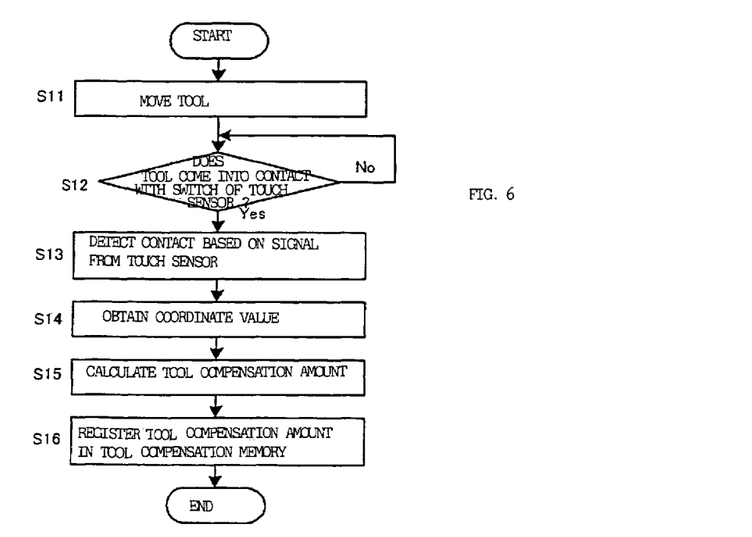
FIG. 6 is a flowchart for explaining procedure for obtaining a tool compensation amount by the structure for detecting the tool cutting edge shown in FIG. 5.

FIG. 5 is a block diagram used for explaining one example (see Japanese Patent Application Laid-open No. 8-25180) of a structure for detecting a tool cutting edge in a conventional numerical control apparatus. FIG. 6 is a flowchart used for explaining procedure for obtaining the tool compensation amount by a structure which detects the tool cutting edge shown in FIG. 5.

In the block diagram in FIG. 5, in a numerical control apparatus 100, a controller 10 controls a drive unit 11 to drive a tool 16. A tool cutting edge 17 is mounted on the tool 16 to machine a workpiece (not shown). A touch sensor 2a comprises a cutting edge abutting surface 2b, and when the tool cutting edge 17 comes into contact with the cutting edge abutting surface 2b, a switch mechanism or the like outputs a detection signal. The contact detector 2c detects this detection signal and detects that the tool cutting edge 17 comes into contact with the cutting edge abutting surface 2b, and sends the detection signal to a tool coordinate value reading unit 13.

A position detector 12 detects a position of the tool cutting edge 17 from position data of a tool drive shaft. Tool coordinate values when the position is detected are sent to the tool coordinate value reading unit 13 in succession.

An operator drives the tool toward the touch sensor at a low speed (step S11), and brings the tool cutting edge 17 into contact with the cutting edge abutting surface 2b of the touch sensor 2a. If the tool cutting edge 17 comes into contact with the cutting edge abutting surface 2b of the touch sensor 2a and a switch is operated (step S12), the contact detector 2c detects the contact (step S13).

If the contact detector 2c informs the tool coordinate value reading unit 13 that the tool cutting edge 17 comes into contact with the cutting edge abutting surface 2b of the touch sensor 2a, the tool coordinate value reading unit 13 obtains the tool compensation value at that time (step S14). The numerical control apparatus 100 calculates the difference between data of the tool coordinate value at that time and position data obtained when the reference tool comes into contact with the touch sensor in advance, as a tool compensation value (step S15), and sets the tool compensation amount in a tool compensation memory 15 of the numerical control apparatus (step S16).

When the tool compensation amount is actually set, however, the touch sensor intermittently reacts a plurality of times and outputs a plurality of detection signals due to impact when vibration of the machine or a tool comes into contact with the touch sensor, or due to impact when the tool is separated from the touch sensor after the tool comes into contact with the touch sensor, and signal input to the numerical control apparatus is carried out a plurality of times continuously in some cases.

The numerical control apparatus calculates the tool compensation value whenever the detection signal generated when the touch sensor reacts is inputted, and registers the tool compensation value in the tool compensation memory. Therefore, a control apparatus is determined by a detection signal which is inputted lastly, and there is a problem that a precise tool compensation amount can not be obtained in some cases.

When the machine tool comprises a plurality of touch sensors or when one touch sensor is provided with a plurality of cutter abutting surfaces which come into contact with the cutting edge of a tool, a tool comes into contact with a touch sensor other than one that should originally detect or with a cutter abutting surface other than one which should detect in some cases when the tool rest is being moved or when the tool comes into contact with the touch sensor.

When the tool comes into contact with wrong touch sensor or cutter abutting surface, the detection signal is an erroneous detection signal, and if a tool compensation amount is calculated based on such erroneous detection signal, there is a problem that a precise tool compensation amount can not be obtained.

SUMMARY OF THE INVENTION

A first aspect of the numerical control apparatus according to the present invention is a numerical control apparatus having tool cutting edge detecting means for detecting a cutting edge position of a tool mounted on a tool rest, and the numerical control apparatus comprises detection signal determining means for determining, as effective, only a detection signal that is first inputted from among a plurality of detection signals which are continuously inputted from the tool cutting edge detecting means.

Even if a plurality of detection signals are continuously inputted from the tool cutting edge detection means, the detection signal determining means determines only a first inputted detection signal from among the detection signals as effective, and determines detection signals which are inputted thereafter as invalid and eliminates the erroneous detection.

The numerical control apparatus of the first aspect can employ the following modes:

(1) Until predetermined time is elapsed after the detection signal determining means receives a first inputted detection signal, and/or until a tool moves a predetermined distance, the detection signal determining means determines a detection signal which is inputted next as invalid. When a detection signal is inputted again after the predetermined time is elapsed after the first detection signal is inputted, the inputted detection signal is determined as effective.

(2) Until the tool moves a predetermined distance after the detection signal determining means receives a first inputted detection signal, the detection signal determining means determines a detection signal which is inputted next as invalid. When a detection signal is inputted again after the tool moves the predetermined distance after the first detection signal is inputted, the inputted detection signal is determined as effective.

(3) The detection signal determining means make both the above determinations (1) and (2). In this case, the time counting and distance measurement are started at the instant when the first detection signal is inputted, and the detection signal determining means may be reset to its initial state, by releasing such determination, after predetermined time is elapsed after the detection signal determining means receives a first input detection signal and/or after the tool moves a predetermined distance.

A second aspect of the numerical control apparatus of the present invention is a numerical control apparatus capable of detecting a tool cutting edge of a tool mounted on a tool rest by contact of the tool cutting edge with a cutting edge abutting surface of a touch sensor, and capable of setting a tool compensation amount from a cutting edge position when the tool cutting edge is detected, and the numerical control apparatus comprises tool coordinate value reading means for reading a coordinate value of the tool when a first detection signal is inputted from the touch sensor, detection signal determining means which inputs the detection signal from the touch sensor, and which enables first detection signal and disenables second and subsequent detection signals, and setting means for setting a determination condition in the detection signal determining means, wherein the tool coordinate value reading means inputs only the first detection signal based on a determination result of the detection signal determining means.

The numerical control apparatus of the second aspect can employ the following modes:

(1) The determination condition which is set by the setting means is a distance the tool moves from the instant when the first signal is inputted to the instant when the second signal is inputted, and a detection signal which is inputted within the moving distance is disenabled.

(2) The determination condition which is set by the setting means is time elapsed after the first signal is inputted, and a detection signal which is inputted within the elapsed time is disenabled.

(3) The determination condition which is set by the setting means is the above (1), a distance the tool moves after the first signal is inputted, and the above (2), elapsed time after the first signal is inputted, and a detection signal which is inputted before at least one of (1) and (2) is satisfied is disenabled. After the determination of the determination condition is completed, the detection signal determining means is reset to its initial state.

In the determination of (1), a signal which is detected until a preset time is elapsed after a first signal at the instant when the tool comes into contact with the touch sensor is received is disenabled as erroneous detection. With this, even if a plurality of signals are inputted from the touch sensor, only the first signal at the instant when the tool comes into contact with the touch sensor is received as effective, and even if the touch sensor reacts a plurality of times, erroneous detection can be eliminated and precise detection can be carried out.

In the determination of (2), the moving direction of the tool is monitored, an effective switch among a plurality of switches is selected according to the moving direction of the tool, thereby eliminating an invalid detection signal, and an effective input signal is selected. With this, erroneous detection caused by erroneous contact is eliminated, and precise detection is carried out. This determination is made under the condition that the determination as to whether the detection made by the tool cutting edge detection means is erroneous detection or not is based on the moving direction of the tool.

In the determination of (2), the numerical control apparatus comprises the selecting means for selecting an input to the detection signal determining means based on the moving direction of the tool. From a plurality of detection signals detected by the tool cutting edge detection means, the selecting means selects a detection signal in a moving direction based on the moving direction of the tool.

According to this structure, the touch sensor is provided in each of the moving directions of the tool rest, and the touch sensor comprises means for determining a moving direction of the tool rest. The selecting means disenables a detection signal from the touch sensor existing in a moving direction which is different from a moving direction of the tool rest, and enables a detection signal from the touch sensor existing in the moving direction.

According to the numerical control apparatus of the present invention, even if the touch sensor reacts a plurality of times, the erroneous detection can be eliminated and precise detection can be carried out.

Further, erroneous detection caused by the erroneous contact can be eliminated, and precise detection can be carried out.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

One example of a structure of a numerical control apparatus according to the present invention will be explained with reference to the block diagram of FIG. 1.

Figure 1:
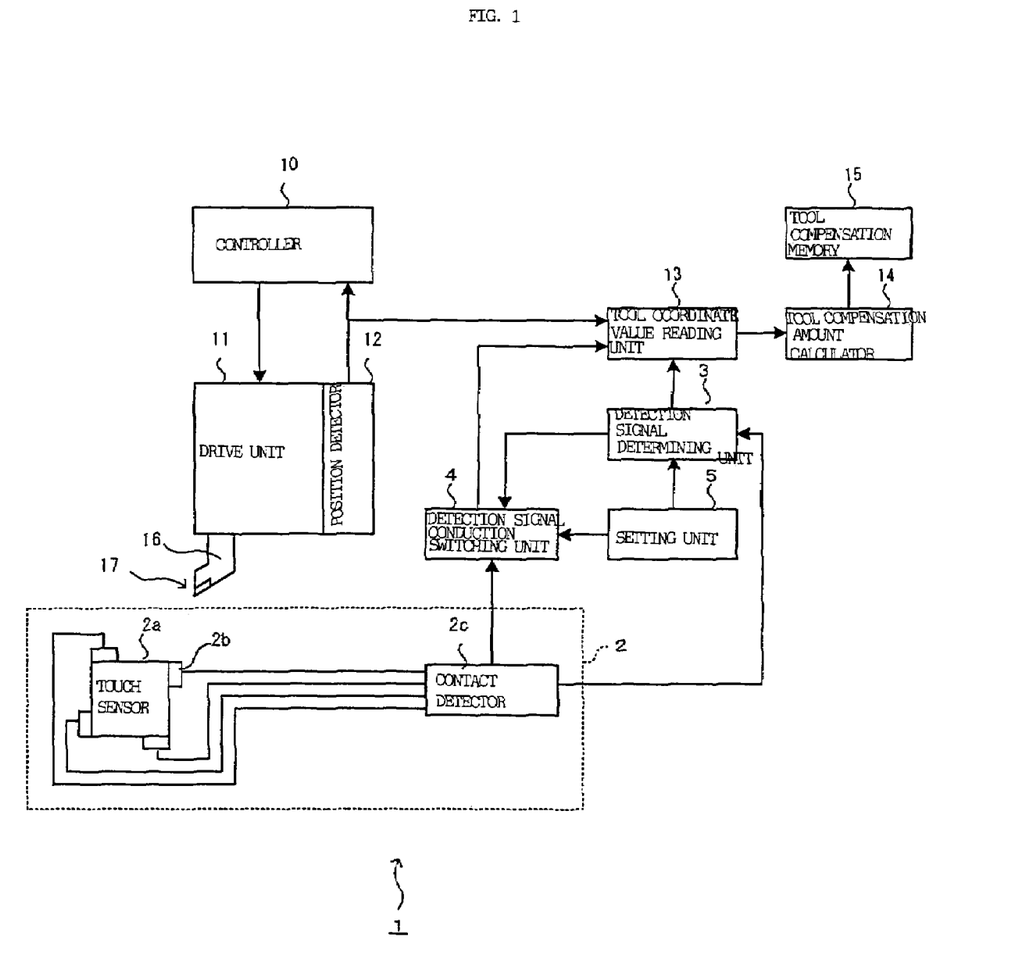
FIG. 1 is a block diagram for explaining one example of a structure of a numerical control apparatus according to the present invention.

In FIG. 1, as a mechanism for driving a tool 16, a numerical control apparatus 1 comprises a controller 10 for positioning a workpiece or a tool on a position set by a work program, a drive unit 11 for controlling position, speed and the like of the tool 16 and the like under control of the controller 10, and a position detector 12 for detecting a position and the like of a drive shaft driven by the drive unit 11. A tool cutting edge 17 is mounted on a tip end of the tool 16, and the tool cutting edge 17 carries out machining of the workpiece (not shown).

As a mechanism for correcting the tool position, the numerical control apparatus 1 comprises a tool cutting edge detector 2 for detecting a position of the tool cutting edge, the tool coordinate value reading unit 13 for reading a tool compensation value from position data of the tool drive shaft which is outputted from the position detector 12 when the tool cutting edge detector 2 detects the tool cutting edge, a tool compensation amount calculator 14 for calculating, as a tool compensation value, the difference between data of the read out tool coordinate value and position data obtained when a reference tool was previously brought into contact with a touch sensor, and a tool compensation memory 15 for storing and registering the calculated tool compensation value. This structure is substantially the same as that shown in FIG. 5.

The object of the present invention is to carry out precise detection by eliminating erroneous detection to be caused when the touch sensor reacts a plurality of times, and by eliminating erroneous detection to be caused by erroneous contacts. As a structure for achieving this object, the numerical control apparatus 1 further comprises a detection signal determining unit 3, a detection signal conduction switching unit 4, a setting unit 5 and means for eliminating erroneous detection caused by erroneous contact in the tool cutting edge detector 2.

The tool cutting edge detector 2 detects a contact of the tool cutting edge 17. The tool cutting edge detector 2 comprises a touch sensor 2a having a plurality of cutting edge abutting surfaces 2b with which the tool cutting edge 17 comes into contact, and a contact detector 2c which detects that the tool cutting edge 17 comes into contact with any of the cutting edge abutting surfaces 2b based on the detection signal.

In the touch sensor 2a, a detection element for detecting the contact is disposed on the cutting edge abutting surface 2b. If the tool cutting edge 17 comes into contact with the cutting edge abutting surface 2b, the detection element is operated and a detection signal is outputted. To detect the contact in correspondence with various moving directions, the plurality of cutting edge abutting surfaces 2b can be disposed such that their directions are different from one another. According to this structure, if with which of the plurality of cutting edge abutting surfaces 2b the tool cutting edge 17 comes into contact is determined, it is possible to identify the moving direction of the tool. In the detection element, it is possible to employ any structures, such as a switch structure using a contact point, a structure using a piezoelectric element and a structure for detecting capacity.

If a signal which is outputted when the tool cutting edge 17 comes into contact with the cutting edge abutting surface 2b of the touch sensor 2a is inputted, the contact detector 2c detects the contact and outputs the detection signal.

The detection signal determining unit 3 receives a detection signal from the tool cutting edge detector 2, determines, in accordance with a determination condition, whether or not the detection signal is a first one from among the signals outputted continuously, and sends a determination result to the detection signal conduction switching unit 4.

When the detection signal determining unit 3 determined that the detection signal is the first detection signal, it is determined that the detection signal is enabled, and the detection signal determining unit 3 sends the same to the tool coordinate value reading unit 13. If it is determined that the detection signal is not the first detection signal, on the other hand, it is determined that the detection signal is disneabled, the detection signal is not sent to the tool coordinate value reading unit 13. The sending operation of the detection signal can be controlled by providing the detection signal conduction switching unit 4 between the tool cutting edge detector 2 and the detection signal determining unit 3, and by driving the detection signal conduction switching unit 4 based on the determination result of the detection signal determining unit 3.

The determination of the detection signal determining unit 3 can be carried out based on time elapsed after the first detection signal is inputted, and/or a moving distance of the tool after the first detection signal is inputted, as the determination condition. The determination condition can be set by the setting unit 5.

The numerical control apparatus 1 of the present invention has a structure in which a detection signal which is erroneously detected by contact with a cutting edge abutting surface which moves in a different direction from a tool is eliminated. According to the structure shown in FIG. 1, the moving direction of the tool is identified depending upon with which one of the plurality of cutting edge abutting surfaces 2b of the touch sensor 2a the tool cutting edge 17 comes into contact. The detection signal determining unit 3 determines with which one of the cutting edge abutting surfaces 2b the tool cutting edge 17 comes into contact based on a detection signal sent from the tool cutting edge detector 2, and determines whether the moving direction of the tool against which the cutting edge abutting surface abuts is a scheduled moving direction or not. If it is determined that the moving direction of the tool is a moving direction rather than the scheduled moving direction, it is determined that erroneous detection is generated, and the detection signal at that time is disenabled.

Another example of the structure of the numerical control apparatus of the present invention will be explained with reference to a block diagram in FIG. 2. Since the structure shown in FIG. 2 is substantially the same as that shown in FIG. 1 except the tool cutting edge detector 2, only different portions from those shown in FIG. 1 will be explained.

Figure 2:
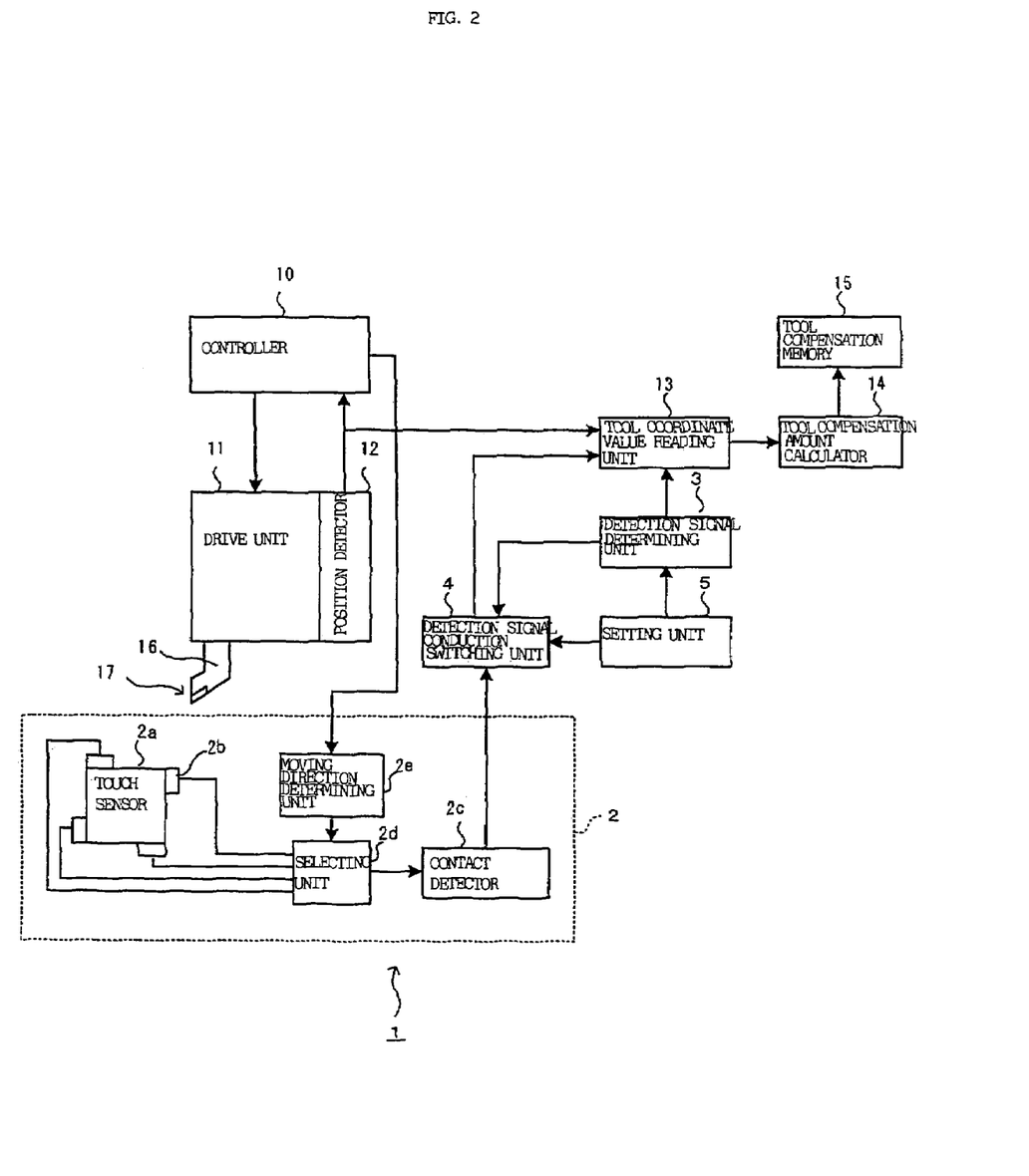
FIG. 2 is a block diagram for explaining another example of the structure of the numerical control apparatus according to the invention.

A tool cutting edge detector 2 shown in FIG. 2 further comprises a selecting unit 2d and a moving direction determining unit 2e in addition to the touch sensor 2a, the cutting edge abutting surface 2b and the contact detector 2c shown in FIG. 1.

The moving direction determining unit 2e obtains data concerning the moving direction of the tool from the controller 10, obtains one of the cutting edge abutting surfaces 2b with which the tool cutting edge 17 comes into contact in the moving direction, and sends the obtained result to the selecting unit 2d. The selecting unit 2d inputs a detection signal detected by the plurality of cutting edge abutting surfaces 2b of the touch sensor 2a, selects a detection signal which can be generated in association with the moving direction of the tool based on the signal inputted from the moving direction determining unit 2e, and sends the selected detection signal to the detection signal conduction switching unit 4 through the contact detector 2c.

Next, an example of a structure of the detection signal determining unit 3 in the numerical control apparatus shown in FIGS. 1 and 2 will be explained with reference to a block diagram shown in FIG. 3.

Figure 3:
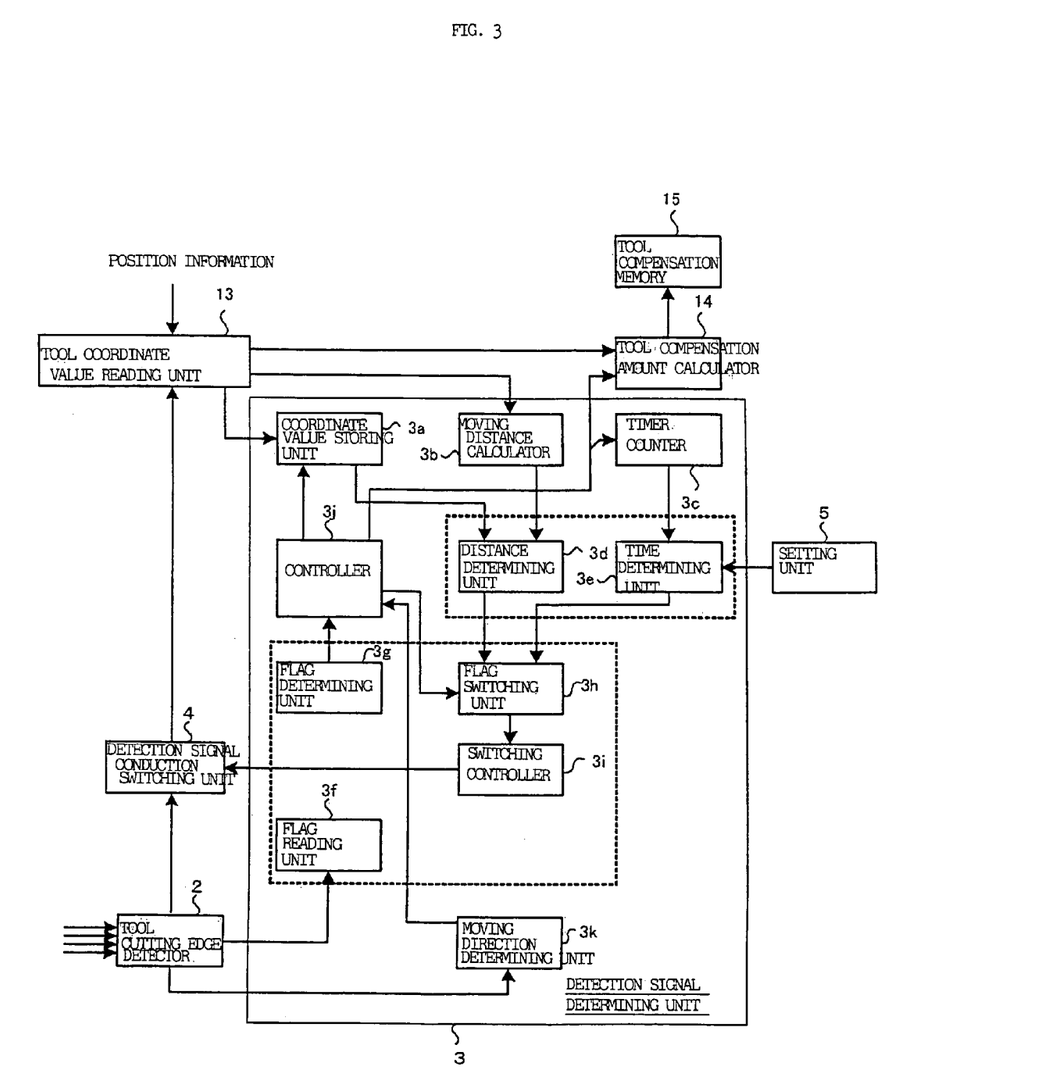
FIG. 3 is a block diagram for explaining an example of a structure of a detection signal determining unit in the numerical control apparatus shown in FIG. 1 or 2.

As shown in FIG. 3, the detection signal determining unit 3 comprises a coordinate value storing unit 3a for obtaining a compensation value of the tool from the tool coordinate value reading unit 13 and stores the compensation value, a moving distance calculator 3b for calculating a distance through which the tool moves after the first detection signal is inputted using the compensation value of the tool from the tool coordinate value reading unit 13, a timer counter 3c for counting elapsed time after the first detection signal is inputted, a distance determining unit 3d which inputs the compensation value stored in the coordinate value storing unit 3a and a moving distance calculated by the moving distance calculator 3b, and which determines whether the current position is with in a predetermined distance or not, a time determining unit 3e which inputs the elapsed time counted by the timer counter 3c and which determines whether the elapsed time is within predetermined time or not, a flag reading unit 3f which carries out flag processing for setting a detection signal to be disenabled when the detection signal is erroneously detected, a flag determining unit 3g, a flag switching unit 3h, a switching controller 3i for controlling switching operation of the detection signal conduction switching unit 4 in accordance with a state of the flag, a control unit 3j which carries out various controls such as start control of distance determination processing and/or time determination processing and flag control when the flag is set, and a moving direction determining unit 3k for determining the moving direction of the tool based on a detection signal from the tool cutting edge detector 2 or a signal from the controller 10.

Here, the elements 3a to 3k are shown in the block diagram as functions carried out by the detection signal determining unit 3, and they need not be hardware, and the elements 3a to 3k may be executed by software processing using a CPU.

The detection signal conduction switching unit 4 switches conduction of a detection signal from the tool cutting edge detector 2 to the tool coordinate value reading unit 13 based on a signal from the switching controller 3i, and enables or disenables the detection signal sent from the tool cutting edge detector 2.

Next, an example of operation of the detection signal determining unit 3 shown in FIG. 3 will be explained with reference to a flowchart in FIG. 4.

If the detection signal determining unit 3 receives a detection signal from the tool cutting edge detector 2 which is sent when the touch sensor 2a detects contact (step S1), the detection signal determining unit 3 reads a setting state of a flag which sets the detection signal to be enabled or disenabled, by the flag reading unit 3f, and the flag determining unit 3g determines the setting state of the read flag (step S2).

As a result of flag determination in step S2, if carrying out disenabling processing of the detection signal is set (step S2), the moving direction determining unit 3k is allowed to determine whether the moving direction of the tool is a direction toward an object to be measured, based on a detection signal from the tool cutting edge detector 2 or a signal from the controller 10. When the moving-direction of the tool is the direction toward the object to be measured, it is determined that the detection signal detected at that time is a correct detection signal. When the moving direction of the tool is not the direction toward the object to be measured, on the other hand, it is determined that the detection signal detected at that time is a wrong detection signal.

In step S3, if it is determined that the moving direction of the tool is the direction toward the object to be measured, the procedure proceeds to next step S4, and various settings are carried out.

If it is determined that the moving direction of the tool is not the direction toward the object to be measured in step S3, or if no detection signal is detected by the tool cutting edge detector 2 in step S1, or if processing for disenabling the detection signal is set based on the flag determination in step S2, on the other hand, processing in step S4 is skipped and processing in step S5 and thereafter are carried out.

The control unit 3j carries out in step S4 setting processing of flag for carrying out disenabling processing of detection signal, storing processing of a compensation value/setting processing of timer counter, calculation of a tool compensation amount, and registration processing of calculated tool compensation amount into the compensation memory.

The flag setting processing for disenabling a detection signal can be carried out by instructing from the control unit 3j the flag switching unit 3h to switch the flag.

The storing processing of the coordinate value can be carried out by sending a storing instruction to the coordinate value storing unit 3a from the control unit 3j. The coordinate value stored at that time is position coordinate of a tool when the first detection signal is detected, and this coordinate value is used when a difference between the coordinate value and the current coordinate value in the distance determining processing is obtained.

The setting processing of the timer counter can be carried out by sending a timer counting operation starting instruction to the timer counter 3c from the control unit 3j. With this processing, the timer counter 3c starts time-counting, and this value is used for determining whether or not predetermined time is elapsed in the time determining processing.

The calculation of the tool compensation amount can be carried out by sending a instruction to the tool compensation amount calculator 14 from the control unit 3j. In this calculation, data of a tool coordinate value at that time is taken in from the tool coordinate value reading unit 13, and the difference between the taken-in data and position data which was obtained when a reference tool is previously brought into contact with the touch sensor is calculated as the tool compensation value.

The registration processing of the calculated tool compensation amount into the compensation memory can be carried out by storing the tool compensation value calculated by the tool compensation amount calculator 14 into the tool compensation memory 15 (step S4).

When a flag for disenabling a detection signal is set (step S5), it is detected whether a determination condition according to a moving distance is set or a determination condition according to an elapsed time is set, as a condition for ignoring the detection signal (step S6).

When a moving distance is set as a determination condition for ignoring a detection signal (step S6), the distance determining unit 3d obtains a moving distance of a tool from the difference between a coordinate value of the current tool and a coordinate value stored when a detection signal is detected, and determines whether the obtained moving distance is within a preset distance or not. This preset distance is for setting a range where detection signals to be detected after a first detected detection signal are ignored, and detection signals detected within this preset distance are disenabled as the erroneous detection, thereby preventing the erroneous detection. A detection signal detected beyond the preset distance is determined as effective signal as a newly detected first signal (step S7).

When elapsed time is set as a determination condition for ignoring a detection signal (step S6), the time determining unit 3e takes in an elapsed time from the timer counter 3c, and determines whether the elapsed time is within preset time or beyond the preset time. The determination of the elapsed time can be made by counting down using the timer counter 3c and by determining whether the counter value becomes "0" or not (steps S9 and S10).

When a moving distance is set as a determination condition for ignoring a detection signal, a detection signal which is detected after a first detected detection signal is disenabled if the moving distance is within the set distance. When elapsed time is set as a determination condition for ignoring a detection signal, a detection signal which is detected after a first detected detection signal is disenabled if the elapsed time is within the set time.

When a moving distance is set as a determination condition for ignoring a detection signal, the setting of the flag is switched and the disenabling processing of the detection signal is completed (step S8) if the moving distance exceeds the set distance. When elapsed time is set as a determination condition for ignoring a detection signal, the setting of the flag is switched and the disenabling processing of the detection signal is completed (step S8) if the elapsed time exceeds the set time.

Figure 4:
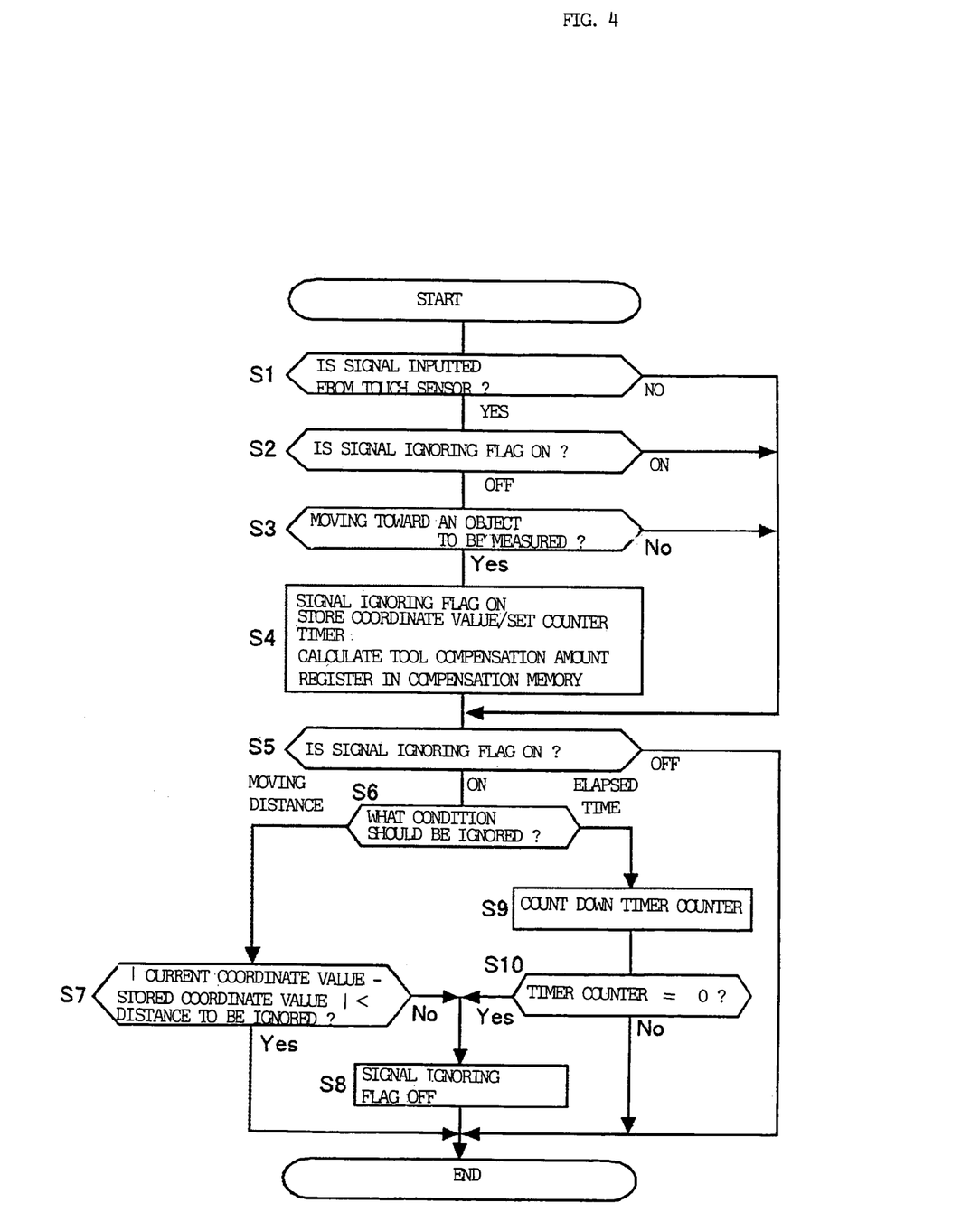
FIG. 4 is a flowchart for explaining an example of operation of the detection signal determining unit shown in FIG. 3.

In the flowchart shown in FIG. 4, one of determination processing according to moving distance and determination processing according to elapsed time is carried out, but both of those processing may be carried out. In this case, when one of the determination result is within the set condition, the disenabling processing of the detection signal may be continued, and both the determination results satisfy both the set conditions, the disenabling processing of the detection signal may be completed.

The invention claimed is:

1. A numerical control apparatus, comprising:
   tool cutting edge detecting means for detecting a cutting edge position of a tool mounted on a tool rest; and
   detection signal determining means for determining, as effective, only a detection signal that is first inputted among a plurality of detection signals which are continuously inputted from the tool cutting edge detecting means.

2. The numerical control apparatus according to claim 1, wherein until predetermined time is elapsed after the detection signal determining means receives a first input detection signal, and/or until a tool moves through a predetermined distance, the detection signal determining means determines a detection signal which is inputted next as invalid.

3. The numerical control apparatus according to claim 2, wherein the predetermined time and the predetermined distance can be changed.

4. The numerical control apparatus according to claim 2, wherein the detection signal determining means can select and set any one of or both of the predetermined time and the predetermined distance.

5. The numerical control apparatus according to claim 1, wherein the detection signal determining means is reset to its initial state after predetermined time is elapsed after the detection signal determining means receives a first input detection signal and/or after the tool moves a predetermined distance.

6. The numerical control apparatus according to claim 1, further comprising selecting means for selecting input of a detection signal from the tool cutting edge detecting means to the detection signal determining means according to the moving direction of the tool.

7. The numerical control apparatus according to claim 6, wherein the selecting means selects a detection signal in a moving direction based on the moving direction of the tool from among a plurality of detection signals detected by the tool cutting edge detecting means.

8. The numerical control apparatus according to claim 1, wherein the tool cutting edge detecting means is a touch sensor.

9. A numerical control apparatus capable of detecting a tool cutting edge of a tool mounted on a tool rest by contact of the tool cutting edge with a cutting edge abutting surface of a touch sensor, and capable of setting a tool compensation amount from a cutting edge position when the tool cutting edge is detected, the numerical control apparatus comprising:
   tool coordinate value reading means for reading a coordinate value of the tool when a first detection signal is inputted from the touch sensor;
   detection signal determining means which inputs the detection signal from the touch sensor, and which enables a first detection signal and disenables second and subsequent detection signals; and
   setting means for setting a determination condition in the detection signal determining means; wherein
   the tool coordinate value reading means inputs only the first detection signal based on a determination result of the detection signal determining means.

10. The numerical control apparatus according to claim 9, wherein the setting means sets the distance the tool moves from the instant when the first signal is inputted to the instant when the second signal is inputted as the determination condition, and a detection signal which is inputted within the moving distance is disenabled.

11. The numerical control apparatus according to claim 9, wherein the setting means sets time elapsed after the first signal is inputted as the determination condition, and a detection signal which is inputted within the elapsed time is disenabled.

12. The numerical control apparatus according to claim 9, wherein the setting means sets a distance the tool moves after the first signal is inputted and time elapsed after the first signal is inputted as the determination condition, and a detection signal which is inputted within the moving distance and within the elapsed time, or within the moving distance or within the elapsed time, is disenabled.

13. The numerical control apparatus according to claim 9, wherein the detection signal determining means is reset to its initial state after the determination by the determination condition is completed.

14. The numerical control apparatus according to claim 9, wherein the touch sensor is set in every moving direction of the tool rest, and the numerical control apparatus further comprising:

means for determining the moving direction of the tool rest; and selecting means which disenables a detection signal from the touch sensor in a moving direction of the tool rest which is different from a scheduled moving direction of the tool rest, and which enables a detection signal from the touch sensor existing in the scheduled moving direction of the tool rest.

* * * * *

UNITED STATES PATENT AND TRADEMARK OFFICE
CERTIFICATE OF CORRECTION

PATENT NO. : 7,328,082 B2  Page 1 of 1
APPLICATION NO. : 11/269572
DATED : February 5, 2008
INVENTOR(S) : Takahiko Endo et al.

It is certified that error appears in the above-identified patent and that said Letters Patent is hereby corrected as shown below:

Column 6, Line 15, change "disneabled," to --disenabled,--.

Column 7, Line 23, change "with in" to --within--.

Column 8, Line 1, change "moving-direction" to --moving direction--.

Column 8, Line 44, change "a" to --an--.

Column 10, Line 41, after "sets" change "the" to --a--.

Signed and Sealed this

Twenty-ninth Day of July, 2008

JON W. DUDAS
*Director of the United States Patent and Trademark Office*